Feb. 28, 1956 P. A. NEETESON 2,736,804

OSCILLATOR SYNCHRONIZATION

Filed Nov. 7, 1951

INVENTOR
Pieter Adrianus Neeteson
By [signature]
Agent

United States Patent Office 2,736,804
Patented Feb. 28, 1956

2,736,804

OSCILLATOR SYNCHRONIZATION

Pieter Adrianus Neeteson, Eindhoven, Netherlands, assignor to Hartford National Bank and Trust Company, Hartford, Conn., as trustee Application November 7, 1951, Serial No. 255,173

Claims priority, application Netherlands December 20, 1950

1 Claim. (Cl. 250—36)

This invention is concerned with a circuit arrangement for synchronizing a relaxation oscillator, one of the tubes of which includes at least a cathode, a first control grid, a screen grid, a second control grid and an anode, the synchronization oscillation being fed to the second control grid of this tube. The object of the invention is to produce satisfactory synchronization with the use of particularly simple means.

According to the invention, only the cathode-first control grid-screen grid portion of the tube forms part of the relaxation oscillator and the oscillations produced in the anode circuit of the said tube by pulse mixing of the relaxation pulses with the synchronizing oscillation are fed to a smoothing filter across which is set up a control voltage dependent on the phase difference between the synchronizing and relaxation oscillations. This control voltage is supplied to one of the grids of the relaxation oscillator in a frequency adjusting sense.

In order that the invention may be more readily understood and readily carried into effect, it will now be described more fully with reference to the drawing, in which several embodiments are shown by way of example.

Figure 1:
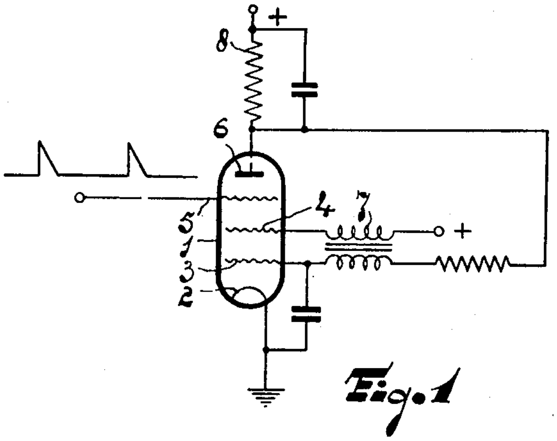
Fig. 1 illustrates a schematic diagram of a blocking oscillator.

Fig. 1 shows a blocking oscillator comprising an electric discharge tube 1 having a cathode 2, a first control grid 3, a screen grid 4, a second control grid 5 and an anode 6. The screen grid 4 is coupled back regeneratively via a transformer 7 to the control grid 3 with the result that the pulsatory oscillations are produced.

The second control grid 5 has fed to it synchronization oscillations, for example, of the shape shown in the figure. In order to produce satisfactory synchronization in accordance with the invention, the tube 1 is adjusted as a pulse mixer so that a control voltage which is proportional to any phase difference between the produced pulsatory oscillation and the synchronizing oscillation is produced across the anode filter 8. A pulse mixer must be understood to mean that the tube 1 is only conductive during the occurrence of the pulses. The control voltage is supplied to the control grid 3 of the tube 1 in a frequency-adjusting sense and this results in synchronization. As a matter of fact, if the oscillator 2—3—4 were to tend to operate at a frequency higher than the synchronization frequency, the pulses and the synchronizing oscillations will be slightly out of phase with one another, so that the voltage drop across filter 8 increases, thus reducing the bias on grid 3 and thus reducing the frequency of the oscillator.

Figure 3:
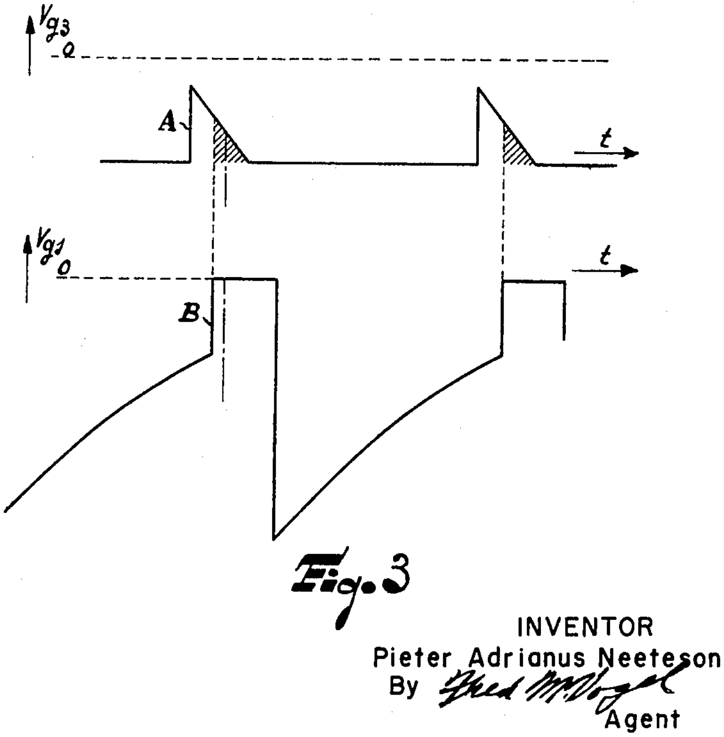
Fig. 3 illustrates a voltage curve of the synchronizing oscillations and the relaxation oscillations plotted against the same time scale.

The arrangement may be more clearly understood with reference to Fig. 3. The curve A in this figure represents the synchronization oscillation $V_{g3}$, the curve B the voltage $V_{g1}$ at the grid 3 of the tube 1, both as a function of the time *t*. The current produced in the anode circuit of the tube 1 is proportional to the shaded portion of the curve A. In the case of an increasing frequency the pulses of the curve B would be produced more rapidly and the area of the shaded portion would be increased. However, the control voltage would increase thereby adjusting the frequency of the relaxation oscillator.

Instead of using the synchronization oscillation shown, a sawtooth or a sinusoidal synchronization oscillation may be used, and in this case the grid 5 may be adjusted to a higher negative bias voltage. As an alternative, the duration of the pulse may be reduced (dash-dotted line in curve B) to a sufficient extent to cause the shaded portion in curve A, which corresponds to the anode current, to be transformed into a small, narrow rectangle.

Figure 2:
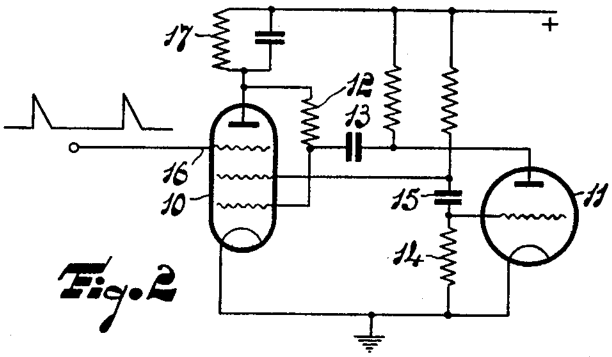
Fig. 2 is a schematic diagram of a multivibrator.

Fig. 2 shows a similar circuit arrangement for a multivibrator comprising the tubes 10 and 11 with grid leaks 12 and 14 and coupling capacitors 13 and 15 between the anode of tube 11 and the first control grid of tube 10 or the screen grid of tube 10 and the control grid of tube 11 respectively. By arranging for the time constant of the resistance-capacity combination 12—13 to exceed that of the resistance-capacity combination 14—15 the multivibrator becomes asymmetric in a manner such that tube 10 is conductive during the shortest time of the oscillation cycle.

In order to produce synchronization with the synchronization oscillation fed to the second control grid 16 of the tube 10, the anode circuit of the tube 10 includes a smoothing filter 17 the voltage of which is fed via the resistor 12 to the control grid of the tube 10, the operation being quite similar to that of the circuit shown in Fig. 1.

What I claim is:

A synchronized oscillator comprising a first electron discharge tube having a cathode, a first control grid, a screen grid, a second control grid and an anode, a second electron discharge tube having a cathode, a single control grid and an anode, a source of operating voltage, a resistor and a condenser connected in parallel between said voltage source and the anode of said first tube, a resistor connected between the anode of said first tube and said first control grid, a condenser connected between said first control grid and the anode of said second tube, a condenser connected between said screen grid and said single control grid, a resistor connected between said voltage source and the anode of said second tube, a resistor connected between said voltage source and said screen grid, a common electrical connection between said cathodes, a resistor connected between said single control grid and said common connection, and a source of synchronizing signals connected to said second control grid.

References Cited in the file of this patent

UNITED STATES PATENTS

| | | |
|---|---|---|
| 2,402,916 | Schroeder | June 25, 1946 |
| 2,538,261 | Moore | Jan. 16, 1951 |

OTHER REFERENCES

Radar Electronic Fundamentals—Navships 900,016, June 1944 (page 206 relied on).